March 4, 1941.   G. A. ISING   2,234,123
ARRANGEMENT FOR MEASURING THE TERRESTRIAL MAGNETIC FIELD
Filed April 14, 1938

G. A. Ising
Inventor

Patented Mar. 4, 1941

2,234,123

UNITED STATES PATENT OFFICE

2,234,123

ARRANGEMENT FOR MEASURING THE TERRESTRIAL MAGNETIC FIELD

Gustaf Adolf Ising, Djursholm, Sweden, assignor to Aktiebolaget Elektrisk Malmletning, Stockholm, Sweden, a company of Sweden Application April 14, 1938, Serial No. 202,071
In Sweden April 16, 1937

3 Claims. (Cl. 175—182)

When it is desired to measure the different components of the terrestrial magnetic field, for instance the horizontal intensity H or the vertical intensity Z, recourse is usually had to comparative measurements with the aid of so called variometers. Such measurements are of great importance in practical geophysics, for example in prospecting work in search for ore or oil deposits, etc.

The variometers mostly used for this purpose are provided with a rotatably supported magnet having a constant magnetic moment $M_1$, the measurements consisting in observing the deflections made by said magnet at different places under the influence of an unknown turning moment Q originating from the field component being studied, and by a known restoring moment $Q_0$. The last mentioned moment can be produced for example with the aid of gravity, through the torsion of a suspension filament, or through the field from a second constant magnet for a solenoid having a known magnetic moment $M_2$, such magnet being brought into a convenient position with respect to $M_1$ by the observer.

As an example of the known measuring methods brief reference shall be made to Z-determinations by means of the widely used magnetic vertical balance, in which the magnet $M_1$ is permitted to rotate about a horizontal axis which is perpendicular to the magnet and extends in a north-south direction, the magnet taking up positions which are slightly inclined with respect to the horizontal plane. Briefly, the use of the instrument can be described as involving a comparison between the turning moments $Q=ZM_1$ and $Q_0=mgr$, where $m$ is the mass of the magnet, $r$ the distance from its turning axis to a vertical line through the center of gravity, and $g$ the acceleration of gravity. For the purpose of increasing the sensitivity, Z is often completely or partly compensated by placing at a certain distance from $M_1$ a compensating magnet $M_k$ which produces a known counter-directed field $Z_0$. In this case $Q=M_1(Z-Z_0)$. Q is determined either by directly measuring the deflection of the magnet $M_1$ for a constant $Z_0$, or else by compensating said deflection to zero by a displacement of the magnet $M_k$, the position of $M_k$ determining the value of $Z_0$.

The most essential inconvenience of the known arrangements is the difficulty of maintaining the zero position, from which the deflection of the movable magnet is to be reckoned, completely constant, in that the sensitive knife edges or points which define the turning axis easily become subjected to damage during transport and through the repeated locking and unlocking operations, this resulting in a change of the zero position.

Furthermore, in order to be able to give a fairly high accuracy of measurement, the instruments require a stable mounting so that, for instance, they do not permit of Z-determinations on board ships.

The present invention has for its object to provide a method which both overcomes said difficulties and also provides new advantages. Said method is characterized by the use of one or more compensating magnets in combination with an easily movable conductor positioned in the compensated field space. Within said field space the component to be measured or Z is fully or partly compensated with the aid of the field $Z_0$ of the compensating magnet or magnets. The remaining small difference $(Z-Z_0)$ is measured, or else the complete compensation is observed with the aid of the easily movable conductor or coil through which a known electric current of changing direction or strength is led from an external source. The conductor is so suspended and orientated that its observed deflections are influenced only by those magnetic lines of force which have the same direction as the field component to be determined. For instance, if it is desired to measure Z, the turning axis of the coil must be horizontal. If in spite of the current variations the conductor remains at rest, this means that full compensation $(Z-Z_0=0)$ has been reached. Otherwise its deflection is a measure of the remaining difference $(Z-Z_0)$. The conductor in question may consist of a rigid coil with or without iron core and turnable about an axis. It can also consist of a flexible wire loop or a stretched fine string, provided that the orientation is such that only lines of force having the direction of the field component to be determined influence the observed deflection.

The varying current, for example interrupted or commutated direct current or sine-shaped alternating current, which through its electromagnetic cooperation with the uncompensated part of the field component causes the deflections of the movable conductor, is preferably supplied to the conductor through leading-in wires or strips from an external current source. The most simple arrangement for producing current variations consists of a battery in combination with an interrupter or commutator operated manually by the observer. Since a commutated direct current may also be considered as an alternating current having a complex wave form, while an interrupted direct current is an alternating current with a superimposed direct current component, it is obvious that an alternating current is always supplied to the movable conductor in carrying out the present invention, the direct current component, if present, only acting to displace the zero position of the indicating pointer or the like. It is also possible to supply the current indirectly through electromagnetic induction from a rigidly mounted primary coil, the movable conductor then forming so to speak the secondary circuit of a transformer. Naturally the arrangement must then be such that the ponderomotive action between the primary and the secondary circuit does not notably influence the deflections of the secondary circuit.

For an explanation of the invention a detailed reference will be made to the accompanying drawing on which Figures 1 and 2 schematically show three different embodiments.

In Figure 1 the moving coil 1 is suspended between the suspension strips 2 which in addition to being twistable and thereby defining the turning axis of the coil also serve as conducting leads from the alternating current source 3. Reference numeral 4 designates the compensating magnet. The plane of the drawing is assumed to be vertical. If the dotted line 1—4 coincides with a vertical line the arrangement will measure the vertical component Z. Figure 1 is turned through 90 degrees in its vertical plane and said plane is so positioned that the line 1—4 becomes horizontal and extends in the magnetic north-south direction, the instrument will measure the horizontal component H.

The deflections of the moving coil 1 may be observed in any suitable known manner in connection with moving coil instruments. For instance the coil may be provided with a pointer 7 the end of which is movable over a scale 8 shown in section in Figure 1.

Figure 2 shows an embodiment in which the coil consists of a single loop formed by two parallel wires 1b each stretched between an appertaining fixed metal block or terminal 9 or 10 respectively and a stationary common end connection 11. The wires 1b carry an indicator member which in the example shown consists of a pointer 6 arranged perpendicular to the wires and movable over a scale 15. The wires 1b are passed in opposite directions by an alternating current supplied at the terminals 9 and 10. A magnetic field component parallel with the pointer will cause opposite deflections of the wires 1b which may be regarded as being equivalent with a swinging motion of the loop about an axis parallel with the wires 1b and extending midway between them. The mode of action is substantially the same as in Figure 1.

The advantages of the new method are as follows:

The observer does not have to trouble with the zero point of the movable measuring member, since all he has to do is to observe the changes of position caused by the current variations.

The mass of the conductor can be chosen very small and its natural frequency rather high, whereby a great measuring speed can be obtained, the accuracy at the same time being only slightly influenced by an instable mounting of the instrument. A high natural frequency may be combined with the maintaining of a considerable sensitivity, if the damping is kept low, so that the conductor so to speak will be comparable with the movable system in a vibration galvanometer. On the other hand it may be convenient in many cases to work with high aperiodic damping, such damping being obtained in the most simple manner by air or liquid friction.

The inconveniences which have been referred to above as being particularly characteristic of the previously known variometer methods have thus been overcome by the invention. In addition the new method has also the following advantages:

The sensitivity can be instantly adapted to the demands of the particular measurements to be carried out by suitably selecting the magnitude of the current variations.

When measuring the Z-component with full compensation of the deflection, using a rigid indicator coil with a vertical winding plane and a horizontal turning axis, or some other equivalent form of conductor, the measurement becomes independent of the azimuth in which the instrument is placed. The same is approximately true also in cases of incomplete compensation if only the deflections of the coil are small.

If permanent magnets are used for the compensation they may easily be protected against the influence of temperature variations by being placed in a heat protecting container, for example a thermos flask filled with ice. In the prior measuring methods, where also the deflectable system consists of a magnet, the withdrawal of said magnet from the influence of temperature is technically a much more complicated task.

The observation of the deflection of the conductor can be effected in an arbitrary direct or indirect manner with high reading accuracy, most simply through direct reading by means of a microscope on the conductor itself or on a pointer secured thereto or through mirror reading. One can also combine the reading arrangement with a photographic recording apparatus, thereby obtaining for example a continuous rapid recording of the field component in question along a measuring line passed over by a vehicle which carries the apparatus.

I claim:

1. An arrangement for measuring variations in terrestrial magnetic field components comprising in combination, a suspended coil having a fixed axis of rotation, means for supplying alternating current to the coil, means for producing an adjustable auxiliary magnetic field in the space around the coil, and means for observing the small vibrations of the coil, remaining as a differential effect after compensating, by means of the auxiliary field, the effect of that terrestrial field component which is perpendicular to the axis of rotation and parallel to the winding plane of the suspended coil.

2. An arrangement according to claim 1 in which said coil is rigid.

3. An arrangement according to claim 1 in which said coil consists of a single loop formed by two parallel wires stretched between stationary alternating current terminals and a stationary common end connection, and an indicating member suspended by said wires so as to be swingable about an axis parallel with said wires.

GUSTAF ADOLF ISING.